United States Patent [19]

Lindquist

[11] 4,022,341

[45] May 10, 1977

[54] LIFTING DEVICE FOR TIRE-RIM ASSEMBLIES

[75] Inventor: John F. Lindquist, Morton, Ill.

[73] Assignee: Caterpillar Tractor Co., Peoria, Ill.

[22] Filed: Mar. 11, 1976

[21] Appl. No.: 665,835

[52] U.S. Cl. .......................... 214/330; 214/147 G; 294/93

[51] Int. Cl.² ...................................... B60B 29/00

[58] Field of Search .......... 214/330, 331, 332, 333, 214/130 C, DIG. 3, DIG. 4, 147 G; 294/67, 93, 103

[56] References Cited

UNITED STATES PATENTS

| | | | |
|---|---|---|---|
| 2,640,604 | 6/1953 | Curley | 214/331 |
| 2,925,300 | 2/1960 | Kelley | 294/67 AA |
| 3,500,891 | 3/1970 | Collins | 214/332 |
| 3,517,959 | 6/1970 | Ferguson | 294/67 R |
| 3,804,277 | 4/1974 | Brown et al. | 214/302 |
| 3,830,387 | 8/1974 | Virnig | 214/331 |
| 3,858,735 | 1/1975 | Zrostlik | 214/333 |

FOREIGN PATENTS OR APPLICATIONS 1,033,497  6/1966  United Kingdom ................. 294/93

Primary Examiner—Lawrence J. Oresky
Attorney, Agent, or Firm—Wegner, Stellman, McCord, Wiles & Wood

[57] ABSTRACT

A lifting device for handling earth moving vehicle tire rim assemblies, which may weigh several thousand pounds, requiring machinery for lifting and maneuvering such assemblies for removal from an earth moving vehicle and replacement onto such a vehicle. The assembly can be suspended from the end of a lifting crane to lift and properly maneuver the weight involved and provides a standard which can be attached to the rim assembly exteriorly of the tire thereon and is so shaped and proportioned for proper maneuvering of the assembly relative to an earth moving vehicle for removal and attachment of the assembly to the vehicle.

8 Claims, 4 Drawing Figures

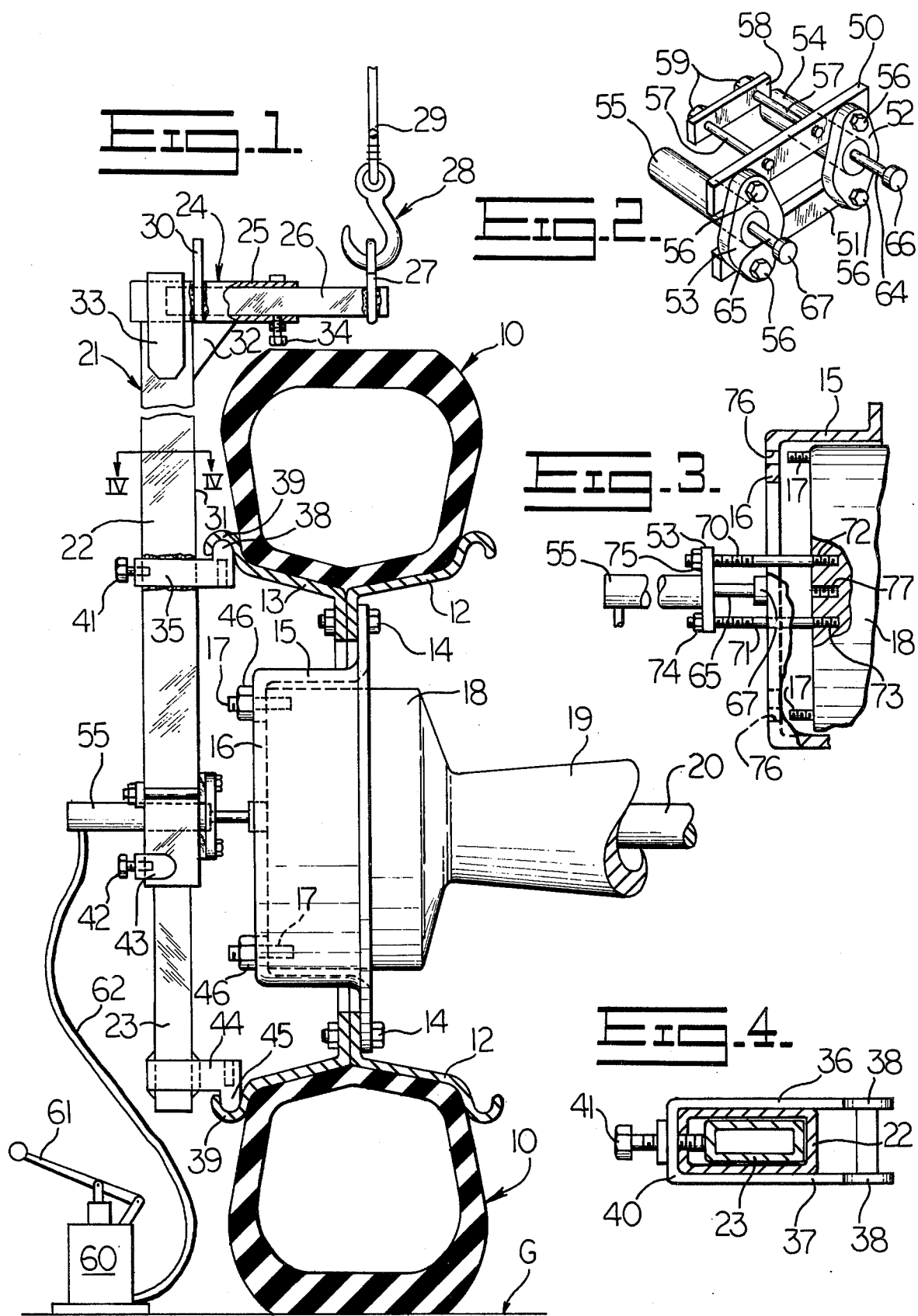

LIFTING DEVICE FOR TIRE-RIM ASSEMBLIES

BACKGROUND OF THE INVENTION

Earth moving vehicles equipped with rubber tires often have to be serviced wherever tire failure occurs on a job site. Such vehicles, while extremely heavy, may be jacked off their wheels hydraulically for changing tires. Spare tires on wheel rims are generally kept at a central repair location and brought to the vehicle in the field where the tire failure may occur.

A typical large wheeled loader may be a vehicle of up to 130,000 pounds in weight and each tire-rim assembly may, depending upon the size involved, weigh from 4,000 to 8,000 pounds or more. Machinery is obviously involved in the handling of such tires, and in the past slings made of chains were often wrapped about the tire with the chains caught between large lugs on the tire in order to handle the same. Often the chains were in the way of workmen attempting to loosen and tighten lug nuts which attach the rim to the wheel of the vehicle, and close positioning of the tire and rim to the wheel of the vehicle was very difficult to achieve.

It is preferable to be able to lift a tire and rim assembly so that it hangs from the end of a crane in an upright position because this is the position in which the tire and rim assembly can be moved laterally onto or off of the studs on the wheel of the earth moving vehicle. Heretofore, the slings generally used for this purpose have not permitted easy maneuvering of the assembly into an upright position.

SUMMARY OF THE INVENTION

It is the principal object of this invention to provide a new and improved lifting device for heavy tire-rim assemblies. More specifically, it is an object of this invention to provide a lifting device in which the tire-rim assembly may be maneuvered easily into an upright position whereby its removal from, or placement upon, the wheel of an earth moving vehicle is facilitated.

The lifting device made according to the invention achieves the foregoing objects in a structure which embodies an upright rigid standard with a cantilevered beam rigidly secured at its upper end and in a position to extend over the tire-rim assembly intended to be lifted. The standard has a bracket extending inwardly under the beam so shaped as to grip a portion of the rim assembly at its outer extremity. The standard is also equipped with a part for securement to the rim assembly at a point diametrically opposite the main lifting bracket. The beam is adjustable in length so that the lifting hook may be placed over the combined center of gravity of the tire-rim assembly and the lifting device. Thus, the entire assembly may be lifted so that the tire rims are in an upright position most useful in attaching the same to a vehicle wheel or removing the same from the wheel.

In addition to the foregoing, there is provided hydraulic jacking means operable against the standard of the lifting device for moving the tire-rim assembly laterally relative to the wheel on the vehicle.

Other objects and advantages will become apparent from the following specification taken in connection with the accompanying drawings.

DESCRIPTION OF THE DRAWINGS

FIG. 1 is an upright view through a tire-rim assembly and associated wheel parts, partially broken away and partially diagrammatic, illustrating the lifting device in position for removal of a tire-rim assembly;

FIG. 2 is a perspective view of the jacking attachment to the lifting device for moving the tire-rim assembly laterally relative to the wheel of an earth moving vehicle;

FIG. 3 is a partially diagrammatic broken view, partially in section, illustrating the use of the jacking device for moving a tire-rim assembly toward a wheel for assembly purposes; and FIG. 4 is a sectional view through the standard of the lifting device taken substantially along line 4—4 in FIG. 1.

DESCRIPTION OF THE PREFERRED EMBODIMENT

As earth moving vehicles have become larger and capable of moving larger amounts of earth, rock, minerals and the like, tire and rim assemblies also have become larger and heavier. In FIG. 1, a tire 10 may have a rubber carcass, substantially as illustrated in U.S. Pat. No. 3,606,921, and may be equipped with a track belt with metal grousers, such as illustrated in U.S. Pat. No. 3,773,394. Such a tire may be mounted upon a rim of the split-type substantially as illustrated in U.S. Pat. No. 3,802,744. The rim has an inner part 12 on the side of the tire next to the vehicle and an outer part 13 secured together by a ring of bolts 14, which also serve to attach the rim parts to an adapter 15 having a mounting ring portion 16 with holes for receiving the multiplicity of studs 17 attached to the wheel hub 18 on the vehicle. In a typical large earth moving machine of the type illustrated, forty eight such studs 17 in a ring on the wheel hub would be needed to attach the tire-rim assembly to the vehicle. A portion of the axle 19 and the drive shaft 20 are also illustrated. The entire tire, track, belt, rim, adapter and bolt assembly in a nominal 88 inch size would have a weight of about 7,400 pounds. The lifting device of this invention is designed to withstand all stresses which may be involved in the handling of weights in excess of the weight of such a typical 88 inch size tire and rim assembly.

The lifting device has an upright standard 21 comprising a hollow rigid metal portion 22 and a rigid metal bar 23 telescoped into the interior of the portion 22. The shape of the standard portion 22 interiorally is such as to closely receive the bar portion 23 in a telescoping manner as illustrated in FIG. 4. Standard portion 22 is of a length to extend above the tire on a vehicle sufficiently to clear any fenders above the tire.

At the top of the standard, a beam 24 is rigidly attached to the standard portion 22 so as to extend substantially at right angles to the standard. The beam comprises a hollow part 25 receiving a rigid bar 26 in telescoped manner so that the length of the beam may be adjusted. A bail 27 is attached to the rigid part 26 at its outer end in order to receive a lifting device such as the hook 28 illustrated on the end of a cable 29 of a lifting crane. Another lifting bail 30 is secured to the stationary beam part 25 substantially in line with the side surface 31 of the standard so that the lifting device, which is quite heavy itself, may be handled during the attachment of the device to a tire-rim assembly by simply moving the hook 28 over to the lifting bail 30. Rigidity between the beam and the standard is assured by the use of a gusset plate 32 welded between the standard and the beam and a welded-on reinforcing metal plate 33 lapping over the joint between the standard and the beam part. The adjustment of the length of the beam may be secured in place by the use of a bolt 34 mounted in the stationary part 25 of the beam and threaded through for pressure engagement against movable beam part 26.

The main lifting force from the lifting crane through the beam and standard is exerted upon the tire-rim assembly through a lifting bracket 35 welded and thus rigidly secured to the standard in the position illustrated. With reference to FIG. 4, the bracket is a heavy metal strap having legs 36 and 37 which are welded to the sides of the standard part 22 and wrapped around the rear of the standard and terminate in an outstanding, upwardly extending projection 38 shaped complementary to the interior surface of the wheel rim flange 39. The rear portion 40 of the bracket about the strap is threaded and tapped in order to receive a pressure applying bolt 41 passing through both the bracket and the standard part 22 in order to apply pressure against the standard part 23 for the purpose of locking the two standard parts together. A similar locking bolt 42 is mounted by a strap 43 welded to the lower end of the standard part 22 for the purpose of similar bearing against the standard part 23 to provide two points of locking the standard parts into an adjusted position.

It will be appreciated that the main lifting force from the lifting hook 28 will be transferred through the beam and the standard to the lifting bracket 35. To ensure that no movement between the lifting device and tire-rim assembly occurs, a second bracket 44 is secured as by welding to the lower end of the standard part 23. This bracket also terminates in parts 45 complementary in shape to the inside of the rim flange 39. Ordinarily, the standard is placed in a position approximating a diameter of the rim, in other words, across the center of the rim so that the brackets 35 and 44 will engage the rim at diametrically opposite points. Once the engagement is made the locking bolts 41 and 42 are tightened so that the lifting device will be securely fastened to the tire-rim assembly.

When removing a tire from a vehicle in the field, the vehicle is raised so that the tire is off the ground G. The lifting device is attached to the rim, as above described, and the nuts 46 removed from the studs 17 on the wheel hub. When this is done, the tire and its rim may be moved laterally off the studs so that the mounting ring parts 16 of the adapter 15 will clear the studs permitting the entire assembly to be swung outwardly from the vehicle for removal purposes. It is often difficult to move such a large weight relative to the vehicle with manpower. In the present invention, hydraulic jacking means may be secured to the standard in such a way as to move the assembly relative to the vehicle. Referring to FIG. 2, a bracket may be frictionally attached to the standard for supporting hydraulic jacks to do the pushing against the vehicle for moving the tire assembly from the vehicle. A pair of plates 50 and 51 are vertically spaced by being attached to mounting plates 52 and 53 respectively of a pair of hydraulic jacks 54 and 55. Bolts 56, shown as four in number, two to each jack, may secure the jacks to the plates 50 and 51. A pair of tie rods 57 are threaded into the upper plate 50 and pass through a rear mounting plate 58 where nuts 59 on the rods may secure the bracket to the upright standard part 22, as illustrated in FIG. 1. A hydraulic pump 60 may be hand operated by its handle 61 to force hydraulic fluid through flexible lines 62 to the jacks to extend the piston rods 64 and 65 of the two jacks respectively in order that the pads 66 and 67 on the ends of the rods may bear against the hub 18. The force of the jacks is applied to the standard but since the brackets 35 and 44 firmly engage and grip in the rim flange, the force is transmitted to the rim and will serve to move the entire tire-rim assembly relative to the vehicle.

The same type of difficulty of laterally moving a heavy assembly inwardly toward the vehicle for mounting a new tire is often experienced. The jacks illustrated for moving the tire away from the vehicle may also be used to aid in placing the entire assembly in proper position on the wheel studs 17 when mounting a new tire to the vehicle. Referring to FIG. 3, there is diagrammatically illustrated how one jack would be used on each side of the circle of studs 17 for jacking the adapter of the wheel rim toward the hub for mounting purposes. Tools are available with most servicing units for removal of the studs 17 from a wheel hub and three such studs are removed at approximately 3 o'clock and three studs are removed at approximately 9 o'clock in the circle of studs on the wheel hub. A pair of tie rods 70 and 71 are threaded into the stud holes 72 and 73 respectively for passing through the holes in the plate 53 on the jacking cylinder 55 where it is secured in place by nuts 74 and 75 on the tie rods. The holes in the jack plates are precisely spaced apart equal to the spacing between two studs 17 on the wheel hub. The piston rod with its pad 67 may engage and push upon the adapter ring 16 and, as the rod extends, force will be applied to move the adapter of the rim assembly toward the wheel hub until the rim studs 17 pass through the holes, such as 76 in the adapter, so that the assembly is properly related to the wheel hub of the vehicle. Once a few nuts are applied to the rim studs 17, the jacking assembly is removed, the studs replaced, which were removed, including the stud which was in hole 77, between the holes 72 and 73, so that the entire ring of studs will secure the tire rim assembly to the hub of the vehicle.

In servicing yards, tire wheel assemblies may not always be in an upright storage position, but may be laid down flat on the side of the tire. The present lifting device may be utilized for raising a tire from such a horizontal position. The securing of the brackets in the rim of the tire may be used to lift the tire from a laying-down position to an upright position. The bracket and standard will exert the forces necessary to elevate the tires even though it weighs several thousand pounds.

I claim:

1. A lifting device for heavy, large tire-rim assemblies having a rim with an exposed outer ring flange curved in radial section and open toward the assembly center, comprising:
    an upright rigid standard having a pair of rigid portions one telescoping into the other for extending the length of the standard,
    a rim engaging bracket outstanding from one standard portion and having a portion shaped complementary to the rim flange interior shape for seating in and engaging the flange on the rim,
    another rim engaging bracket outstanding from the other standard portion and having a portion shaped complementary to the rim flange interior shape for seating in and engaging the flange on the rim at a diametrically opposite position across the rim from said first bracket, said shaped bracket portions locking the standard to the wheel rim when so seated in said rim flange, means for locking said standard portions in extended position with said brackets seated in and engaging the rim and the standard upright beside the tire-rim assembly, a beam secured to and outstanding from the upper end of the standard extending in the same direction therefrom as said brackets extend, and a lifting attachment on the beam spaced from said standard whereby a tire and rim assembly may be suspended on said device in an upright position for removal from and replacement upon a vehicle wheel.

2. A lifting device as specified in claim 1 wherein said beam has a part rigidly secured to said standard and a beam portion telescoped with said part with said lifting attachment secured to said beam portion for adjusting the lifting point to a position over the center of gravity of the combined tire-rim assembly and lifting device.

3. A lifting device as specified in claim 2 including a lifting attachment at the upper end of said standard for machine maneuvering the lifting device during attachment to a tire-rim assembly.

4. A lifting device as specified in claim 1 wherein the beam and upper standard portion are rigidly secured together at approximately right angles to each other and one of the rim engaging brackets is rigidly secured to the upper standard portion for directly bearing most of the weight of a tire-rim assembly during lifting.

5. A lifting device as specified in claim 1 wherein the standard comprises two rigid bars, an outer bar having its interior complementarily shaped to slidingly receive an inner bar and lock bolts are mounted on the outer bar to engage the inner bar to frictionally lock the bars in adjusted telescoped relation, the outer bar being uppermost so that the rim engaging bracket thereon may support the majority of the tire-rim assembly weight while the lower rim engaging bracket maintains the device attached to the assembly.

6. A lifting device as specified in claim 1 wherein each rim engaging bracket shaped portion seated in said rim ring flange locks the standard against movement both toward and away from the rim and a pushing jack is mounted on the standard between said brackets for forcing lateral movement of the tire-rim assembly relative to a vehicle wheel by forces applied to said standard and said rim flange.

7. A lifting device for an earth moving vehicle tire-rim assembly, wherein the rim has an outer inwardly directed ring flange, comprising:

an upright standard having an outstanding rim engaging bracket shaped to hook into the interior of a vehicle rim ring flange, a beam cantilevered relative to the upper end of the standard, rigidly secured to the standard and extending from the standard over said bracket to a position beyond the rim-engaging portion of the bracket, adjustable securing means on the lower end of the standard for securing the standard to said tire rim assembly rim ring flange at a position interior thereof diametric to said bracket, said means and bracket locking the standard to the assembly when adjusted to be so hooked and secured, and a lifting attachment on the beam at a position generally over the tire-rim assembly and lifting device combined center of gravity for upright lifting and maneuvering of the tire-rim assembly whereby a tire and rim assembly may be suspended on said device in an upright position for removal from and replacement upon a vehicle wheel.

8. A lifting device as specified in claim 7 wherein jack means are mounted upon said standard below said bracket for forcing lateral movement of said standard and a tire-rim assembly relative to a vehicle through forces applied to said rim ring flange and to said standard by said jack means.

* * * * *